Patented Aug. 11, 1936

2,050,442

UNITED STATES PATENT OFFICE 2,050,442

MANUFACTURE OF ETHYL ALCOHOL

Floyd J. Metzger, New York, N. Y., assignor to Air Reduction Company, Inc., New York, N. Y., a corporation of New York

REISSUED

No Drawing. Application June 27, 1931, Serial No. 547,452

14 Claims. (Cl. 260—156)

This invention relates to the production of ethyl alcohol from ethylene.

It is known that ethyl alcohol can be manufactured from ethylene by absorbing the ethylene in strong sulfuric acid to form ethyl hydrogen sulfate or diethyl sulfate, diluting with water to hydrolyze the ethyl sulfate, distilling the resulting ethyl alcohol from the diluted mixture and reconcentrating the dilute acid for further use in the process. This process involves a series of separate and successive operations carried out in different apparatus. The reconcentration of the dilute acid is a major expense of the process. The formation of ethyl alcohol in this way is usually accompanied by the formation of a considerable amount of ether with corresponding reduction in the amount of alcohol produced.

The present invention provides an improved method for the manufacture of ethyl alcohol, which enables the objections above mentioned to be largely overcome and minimized, which eliminates the necessity of using strong sulfuric acid and of reconcentrating dilute acid, which enables the production of the alcohol to be accomplished without any considerable formation of ether, which can be carried out in a continuous manner, and which has other advantages, such as those hereinafter set forth.

According to the process of the present invention the alcohol is produced continuously by passing the ethylene, in admixture with suitable proportions of steam, into intimate contact with an acid catalyst, and particularly a sulfuric acid catalyst, while maintaining the catalyst at a high temperature and maintaining the gases under a high pressure, with resulting conversion of the ethylene into alcohol, which is subsequently condensed along with the excess steam from the escaping gases.

I have found that ethyl alcohol can readily be produced in a continuous manner by passing a mixture of ethylene and steam, in suitable proportions, into intimate contact with a relatively dilute sulfuric acid catalyst at a regulated high temperature and pressure, with resulting formation of a gaseous mixture containing the alcohol together with the excess of ethylene and steam, from which the alcohol and steam can be readily condensed.

I have further found that this conversion of ethylene into ethyl alcohol can advantageously be carried out in a cyclic manner by maintaining a circulating stream of ethylene under a high pressure, admixing therewith steam in suitable proportions, passing the resulting mixture through or into contact with the acid catalyst at a high temperature, condensing the alcohol and excess steam while maintaining the high pressure, and recycling the ethylene with suitable further additions of ethylene and steam in the further carrying out of the process.

The catalyst which I have found particularly valuable is a sulfuric acid catalyst which is a much weaker sulfuric acid than the strong acid heretofore commercially used in the manufacture of ethyl alcohol. The sulfuric acid employed may have a strength, for example, of from 15 to 70% of sulfuric acid. Apparently the ethylene combines to a considerable extent with the acid to form ethyl sulfate, so that the catalyst is a mixture of sulfuric acid and an ethyl sulfate. The strength of the acid catalyst is maintained substantially constant at the high temperatures and pressures employed by using regulated proportions of ethylene and steam in the gaseous mixture passed through or into intimate contact with the acid catalyst.

The temperatures employed in the present process will vary with the strength of the acid catalyst, the pressure and the ratio of steam to ethylene employed, but in general the temperatures are much higher than it is possible to employ with the same strength of acid at atmospheric pressure. By passing the mixture of steam and ethylene in contact with the sulfuric acid catalyst under a high pressure it is possible to use a much higher temperature without increasing the concentration of the acid and even with a much more dilute acid as compared with operations at atmospheric pressure. Using a sulfuric acid catalyst, without promoters, and with mixtures of steam and ethylene, the temperatures are in general in excess of about 170° C. and for best results I have found a temperature considerably in excess of 200° to be advantageous, e. g., around 235 to 250° C. The temperature, however, cannot be varied independently of the other conditions because the temperature, pressure, acid strength and ratio of steam and ethylene are interdependent. With the same acid strength and the same ratio of steam and ethylene the temperature can be very considerably increased by carrying out the process under a high pressure, and the increased temperature seems to have the effect of greatly increasing the activity of the acid catalyst and promoting the formation of alcohol.

The pressures employed in the present process are in general in excess of 100 pounds, and much higher pressures are more advantageous, such as pressures above 200 pounds, and more particularly pressures around 600 pounds or higher. With the higher pressures, for example, around 600 pounds, or even much higher pressures, there should be a proper correlation of the strength of the acid catalyst, the temperature and the proportion of steam and ethylene. With such high pressures it is possible to use temperatures much higher than it is possible to use at atmospheric pressure with a sulfuric acid catalyst and at the same time to maintain a much lower strength of acid catalyst. The combined use of a high temperature and pressure with a relatively dilute acid catalyst makes it possible to produce ethyl alcohol in commercial quantities without the objectionable decomposition which would take place at the higher temperatures and with stronger acids at atmospheric pressure.

The proportions of steam and ethylene can be varied but in general for the production of alcohol free or relatively free from ether I have found it advantageous to use an excess of steam over that theoretically required for combining with the ethylene for example, the ratio of one and one-half parts of steam to one of ethylene or of two of steam to one of ethylene or even a higher ratio of steam to ethylene, e. g., four or more parts of steam to one of ethylene.

I have also found it possible to produce ether as well as alcohol, where that is desired, by using a lower ratio of steam to ethylene or a stronger acid or a lower pressure; but in general the strength of the acid catalyst will depend upon the ratio of steam to ethylene and the conditions of temperature and pressure employed. When a constant mixture of steam and ethylene is passed through or in intimate contact with the acid catalyst under a high temperature and pressure, the strength of the acid catalyst will reach an equilibrium and will thereafter remain at the equilibrium strength as long as the conditions of the process, i. e., the temperature, pressure and ratio of steam to ethylene remain constant; but the equilibrium reached will represent a much more dilute acid than that which would represent the equilibrium at the same temperature and at atmospheric pressure.

The ethylene employed in the process may be obtained from any suitable source, such as by liquefaction and rectification of the gases produced from oil or gas cracking operations. Pure or relatively pure ethylene can readily be produced and when produced or available can be used in the process. Instead of using the pure ethylene, the impure hydrocarbon can be used admixed with other gases or vapors which are not objectionable in the process, such as saturated hydrocarbon vapors which are not changed during the process, or other inert gases or vapors.

Where the ethylene employed in the process is impure, it will be evident that the extent to which it can be recycled, when the process is carried out with recycling, will be limited by the building up of impurities or of inert gases or vapors or by the formation of undesirable reaction products therefrom, in which case the gas after one or more passages through the converter should not be further cycled or should be purified or a constant discharge of the recycling gases should be effected to maintain the recycling gases of sufficient purity.

The steam employed in the process can be supplied from any suitable source, such as a high pressure steam boiler, and admixed with the ethylene in regulated proportions. The mixture of steam and ethylene can also be prepared by passing the ethylene through a body of water maintained at a sufficiently high temperature and under the same pressure employed in the converter. In this case the recirculating ethylene can be passed through such a boiler containing water and the temperature of the boiler maintained to give the proper proportion of steam and ethylene in the gases passing therefrom to the converter.

Instead of carrying out the process in a cyclic manner, by passing the mixture of steam and ethylene through a single converter, then through a condenser, and then recirculating the ethylene with admixture of steam under the same high pressure to the same converter, two or more converters can be employed in series with or without condensation of the alcohol and steam from the gases escaping from the first converter, then admixing additional steam or ethylene or both if desired, and passing the gases through the second converter, etc., and in such case the condensers as well as the converters are advantageously maintained under a high pressure so that condensation as well as conversion may take place under such pressure.

The use of a series of converters makes possible the maintenance of different strengths of acid catalyst and of different temperature and pressure conditions in the different converters, thereby making it possible for example to produce ethyl alcohol free or relatively free from ether in one converter and a mixture of alcohol and ether in another converter where this is desired.

Instead of using a sulfuric acid catalyst, other acid catalysts can be employed, for example, a phosphoric acid catalyst, or a mixture of phosphoric and sulfuric acids. In referring to the acid catalyst I use the term to include the acid catalyst with whatever other constituents such as alkyl sulfates it may contain during the catalytic conversion. Provision should be made for insuring intimate contact of the gases with the acid catalyst, such as the dissemination or distribution of the gases throughout the acid catalyst. Where the converter contains a considerable body of acid the distribution of the gas and the intimate contact of the gas and acid can be promoted by suitable filling material which impedes the upward flow of the gases through the acid. The filling material should of course be of suitable acid-resistance material. Instead of using a liquid body of the acid catalyst, with passage of the gases into intimate contact therewith, the acids may be absorbed on suitable carriers such as pumice stone, silica gel, etc.

The action of the acid catalyst can be promoted by the addition thereto of certain promoters, or of certain substances which form or become promoters during the carrying out of this process. Silver or silver sulfate may be added in small amount as such a promoter, and the use of such a promoter enables the process to be carried out at somewhat lower temperatures, or with somewhat increased yields, than when promoters are not present. Lithium sulfate may also be added with beneficial results.

The apparatus employed in carrying out the process includes a converter or converter chamber containing the acid catalyst and provided with means, such as a filling material distributed throughout the acid, for bringing the mixture of ethylene and steam into intimate contact therewith while maintaining the catalyst and the gases under the necessary pressure and at the necessary high temperature, together with means for supplying the steam and ethylene in suitable proportions and under the necessary high pressure, and a condenser for condensing the alcohol and admixed steam from the escaping gases. That part of the apparatus which comes in contact with the acid catalyst should of course be made of suitable acid resistant material, resistant to the action of the acid catalyst at the high temperatures employed.

Where the process is carried out in a cyclic manner the condenser as well as the converter is maintained under a high pressure and the unconverted ethylene is recycled, additional ethylene admixed therewith, and steam also admixed therewith so that provision is made for supplying both steam and additional ethylene to the cycle under the necessary high pressure. The condenser for condensing the alcohol or alcohol and ether may be a multi-stage condenser, with the separate sections or condensers maintained at progressively lower temperatures so that, for example, the ethyl alcohol is largely condensed in the first condenser in the form of a solution of alcohol in water, and the ether is largely separated in a subsequent condenser maintained at a lower temperature. Where ether is formed along with alcohol it is not necessary to condense out the ether, particularly where it is formed only in small amounts, but the ether can be recirculated, along with the ethylene, and again passed through the converter, with maintenance of the condenser at a temperature that will condense the alcohol more or less completely without condensing any considerable amount of ether. The recycled ether will be subjected to the action of the catalyst and, by its presence, may retard the further formation of ether, or may itself be hydrolyzed by the steam and catalyst and converted into alcohol.

In general, the stronger acid catalysts will be employed at a lower pressure and temperature and the weaker acid catalysts at a higher pressure and temperature. For example, with acid catalysts of around 65 to 70% acid the pressure may be around 100 pounds and the temperature, which will vary somewhat with the ratio of steam to ethylene, may be around 170° C. With a sulfuric acid catalyst of around 40 to 45% acid, higher pressures around 600 pounds and higher temperatures around 250° C. are advantageous.

The nature of the invention will be further illustrated by the following specific examples, but it will be understood that the invention is not limited thereto.

Ethylene and steam in the proportions of one part by volume of ethylene to two parts by volume of steam (measured at atmospheric pressure) were passed through a sulfuric acid catalyst maintained at a temperature of about 250° C. and at a pressure of about 600 pounds gauge. The vlume of ethylene passed through the catalyst was about 90 cubic feet per hour (measured at atmospheric pressure) per liter of acid catalyst and there was obtained a conversion of about 10% of the ethylene into alcohol with little or no ether formed. The alcohol was condensed in the form of a solution containing around 10 or 14% of alcohol by volume, the alcohol yield being about one-half liter per hour of absolute alcohol per liter of acid catalyst employed. The strength of the acid catalyst was the equilibrium strength under the conditions of temperature and pressure and ratio of steam to ethylene employed. The acid catalyst tested on discontinuation of the process and on cooling the apparatus and removing the catalyst from the converter showed an acid strength of about 41% sulfuric acid and a small content of ethyl sulfate.

With lower ratios of steam to ethylene or with lower pressures and higher acid strength of the catalyst I have found that ether is produced simultaneously with alcohol. For example, with about one part of steam to two parts of ethylene and at a temperature of about 170° C. and a pressure of about 200 pounds and a sulfuric acid catalyst in equilibrium with such temperature, pressure and ratio of steam to ethylene, the amount of ether produced was about equal to the amount of alcohol produced or somewhat greater. At a pressure of about 200 pounds and a temperature of about 210° C. and a ratio of about one and one-half parts of steam to one of ethylene the amount of ether was only about one-half that of the alcohol. With temperatures up to around 225° C. at 200 pounds pressure and with a ratio of four parts of steam to one of ethylene the alcohol produced was practically free from ether. In general the increase in the amount of steam tends to reduce the amount of ether formed and by using a sufficient amount of steam and suitable conditions of temperature, pressure and strength of acid catalyst, the alcohol produced will be free or practically free from ether. The proportion of alcohol to ether may be varied also by varying the time of contact between the vapors and the catalyst.

It is important to avoid too low a ratio of steam with too high a temperature since such conditions tend to give decomposition products of an objectionable character.

As distinguished from prior art processes in which ethylene is absorbed in strong sulfuric acid followed by dilution to effect hydrolysis and distillation of the alcohol and reconcentration of the acid for further absorption of the ethylene, the present process makes use of dilute acid, that is, more dilute than the strong acids required in such prior processes. The acids employed are non-volatile inorganic acids which, under the high pressures used in the process can be heated to a sufficiently high temperature to exert the desired catalytic effect continuously upon the water vapor and ethylene passed continuously into contact therewith, while maintaining the acids as dilute acids of substantially uniform strength throughout the carrying out of the process when uniform conditions of temperature, pressure and ratio of steam and ethylene, are maintained.

It will thus be seen that the present process eliminates the use of strong sulfuric acid which has heretofore been used in the production of alcohol from ethylene; that the present process eliminates the need of dilution of the strong acid solution of the ethylene and distillation of the alcohol from the diluted mixture; and that the present process eliminates entirely the need of reconcentrating dilute acid which is required in such prior processes.

It will also be seen that the present process is a continuous process in which the strength of the acid catalyst, once established, remains constant, in which a high pressure of the gases is maintained as well as a high temperature during the catalytic conversion, and that a relatively high ratio of steam to ethylene is employed with a relatively dilute acid catalyst, under conditions coordinated as to temperature, pressure, ratio of steam and ethylene and strength of acid catalyst so that the alcohol can be continuously produced under uniform conditions which can be maintained for long periods of time.

I claim:

1. The method of producing ethyl alcohol in a continuous manner which comprises passing a mixture of ethylene and water vapor in regulated proportions under a high pressure, in excess of 100 pounds per square inch, into intimate contact with a dilute non-volatile inorganic acid catalyst maintained at an effective and substantially uniform catalytic strength and temperature, the temperature being in excess of about 170° C. and cooling the resulting gases to condense the alcohol therefrom.

2. The method of producing ethyl alcohol in a continuous manner which comprises passing a mixture of ethylene and water vapor in regulated proportions under a high pressure, in excess of 100 pounds per square inch, into intimate contact with a dilute sulfuric acid catalyst of from 15 to 70% sulfuric acid and at a temperature in excess of 200° C. to effect continuous formation of ethyl alcohol, and cooling the resulting gases to condense the alcohol therefrom.

3. The method of producing ethyl alcohol in a continuous manner which comprises passing a mixture of ethylene and water vapor in regulated proportions, with the water vapor in excess of the ethylene, under a high pressure, in excess of 100 pounds per square inch, into intimate contact with a dilute non-volatile inorganic acid catalyst containing a promoter, said acid catalyst being maintained at an effective and substantially uniform catalytic strength and temperature, the temperature being in excess of 170° C. and cooling the resulting gases to condense the alcohol therefrom.

4. The method of producing ethyl alcohol in a continuous manner which comprises passing a mixture of ethylene and water vapor in regulated proportions under a high pressure, in excess of 100 pounds per square inch into intimate contact with a dilute sulfuric acid catalyst containing about 15 to 70% sulfuric acid and a promoter, said catalyst being maintained at an effective and substantially uniform catalytic strength and temperature, the temperature being in excess of 170° C. and cooling the resulting gases to condense the alcohol therefrom.

5. The process of producing ethyl alcohol in a continuous manner from ethylene which comprises passing a mixture of ethylene and water vapor, with the water vapor in excess of ethylene into intimate contact with a sulfuric acid catalyst of less than 70% strength under a pressure in excess of about 100 pounds to the square inch and at a temperature in excess of 200° C. sufficient to maintain the strength of the acid catalyst, and condensing alcohol from the resulting gas.

6. The process of producing ethyl alcohol in a continuous manner from ethylene which comprises passing a mixture of ethylene and water vapor, the water vapor being in excess of the amount of ethylene, in intimate contact with the sulfuric acid catalyst, the acid having a strength materially less than 70%, under a pressure in excess of about 200 pounds to the square inch and at a temperature of around 200 to 270° C. and condensing the alcohol from the resulting gases.

7. The process of producing ethyl alcohol in a continuous manner from ethylene which comprises passing a mixture of about one and one-half to two parts of water vapor and one part of ethylene into intimate contact with a sulfuric acid catalyst, the acid having a strength materially less than 70%, at a temperature of around 250° C. and a pressure of around 600 pounds per square inch or higher and condensing the alcohol from the resulting gases.

8. The process of producing ethyl alcohol in a continuous manner which comprises passing a mixture of ethylene and water vapor, the water vapor being in excess of the ethylene, into intimate contact with a sulfuric acid catalyst of from 15 to 45% sulfuric acid maintained at a temperature around 250° C. and at a pressure exceeding about 600 pounds per square inch, cooling the resulting gases to condense alcohol therefrom, admixing additional water vapor with the remaining ethylene and admixing additional ethylene to make up for that converted into alcohol, and recirculating the resulting admixed ethylene and water vapor in contact with the acid catalyst, the ethylene being maintained as a circulating stream of ethylene at approximately the same high pressure while passing in contact with the acid catalyst and during subsequent cooling and further admixture of steam and ethylene therewith.

9. The process of producing both ethyl alcohol and ether in a continuous manner which comprises passing a mixture of ethylene and water vapor in regulated proportions, and with the ethylene in excess of the water vapor, and under a high pressure in excess of 100 pounds per square inch into intimate contact with a dilute sulfuric acid catalyst maintained at an effective and substantially uniform catalytic strength and temperature for the production of both alcohol and ether, the acid being of a strength of from 15 to 70% and the temperature being in excess of 170° C., and cooling the resulting gases to condense the alcohol and ether therefrom.

10. The method of producing substantially ether-free ethyl alcohol in a continuous manner which comprises passing a mixture of ethylene and water vapor with the water vapor materially in excess of the ethylene into intimate contact with a dilute sulfuric acid catalyst maintained at a substantially uniform catalytic strength within the range of 15 to 70% sulfuric acid and at a substantially uniform temperature in excess of 200° C. and under a high pressure in excess of 200 pounds per square inch and with regulation of the temperature, pressure, acid strength and excess of steam over ethylene to effect conversion of ethylene into ethyl alcohol substantially free from admixed ether and cooling the resulting gases in a continuous manner to condense alcohol therefrom.

11. The method of producing substantially ether-free ethyl alcohol in a continuous manner which comprises passing a mixture of ethylene and water vapor with the water vapor in excess of the ethylene into intimate contact with a dilute sulfuric acid catalyst containing in excess of about 15% sulfuric acid but not more than about 45% sulfuric acid at a temperature in excess of about 235° C. and under a high pressure in excess of about 600 pounds per square inch and with regulation of the temperature, pressure, ratio of steam to ethylene and acid strength to effect conversion of ethylene to ethyl alcohol substantially free from admixed ether, and cooling the resulting gases to condense aqueous alcohol therefrom.

12. The method of producing ethyl alcohol in a continuous manner which comprises passing a mixture of ethylene and water vapor under a pressure in excess of 100 pounds per square inch, into intimate contact with a dilute non-volatile inorganic acid catalyst maintained at an effective and substantially uniform catalytic strength and temperature, the temperature being about 170° C. and removing alcohol from the resulting vapors.

13. The method of producing ethyl alcohol in a continuous manner which comprises passing a mixture of ethylene and water vapor under a pressure in excess of 100 pounds per square inch, into intimate contact with a sulfuric acid catalyst of about 60 to about 70% strength and maintained at a temperature of about 170° C. and removing alcohol from the resulting vapors.

14. The method of producing ethyl alcohol in a continuous manner which comprises passing a mixture of ethylene and water vapor under a pressure in excess of 100 pounds per square inch, into intimate contact with a sulfuric acid catalyst of about 60 to about 70% strength and maintained at a temperature of about 170° C. and removing alcohol from the resulting vapors said catalyst containing silver sulfate as a promoter.

FLOYD J. METZGER.